A method of forming a seal in a confined configuration with a moisture curable, alkoxy-functional RTV composition. The method comprises the steps of: (i) applying to a first substrate comprising a grooved substantially flat surface a moisture curable alkoxy-functional RTV composition; (ii) positioning the grooved substantially flat surface in occluding proximity with a substantially flat surface of a second substrate, so the alkoxy-functional RTV composition effects a seal therebetween; (iii) exposing the alkoxy-functional RTV composition to a detrimental temperature; and (iv) curing the alkoxy-functional RTV composition.

United States Patent [19]
Freiberg et al.

[11] Patent Number: 6,132,664
[45] Date of Patent: Oct. 17, 2000

[54] METHOD OF FORMING A SEAL IN A CONFINED CONFIGURATION WITH AN ALKOXY-FUNCTIONAL RTV COMPOSITION

[75] Inventors: Alan Lee Freiberg, Bay City; Richard Alan Palmer, Midland, both of Mich.

[73] Assignee: Dow Corning Corporation, Midland, Mich.

[21] Appl. No.: 08/997,524

[22] Filed: Dec. 23, 1997

[51] Int. Cl.$^7$ .................................................. B32B 31/06
[52] U.S. Cl. .................. 264/261; 264/328.2; 264/331.15
[58] Field of Search ................. 264/261, 328.1, 264/328.2, 331.11, 331.15

[56] References Cited

U.S. PATENT DOCUMENTS

| | | |
|---|---|---|
| 4,387,177 | 6/1983 | Mine et al. . |
| 4,525,565 | 6/1985 | Laisney et al. . |
| 4,525,566 | 6/1985 | Homan et al. . |
| 4,530,882 | 7/1985 | Homan et al. . |
| 4,585,705 | 4/1986 | Broderick et al. . |
| 4,681,908 | 7/1987 | Broderick et al. . |
| 4,719,065 | 1/1988 | Gibbon ............................ 264/DIG. 65 |
| 4,743,474 | 5/1988 | Homan . |
| 4,871,827 | 10/1989 | Klosowski et al. . |
| 4,888,404 | 12/1989 | Klosowski et al. . |
| 5,286,766 | 2/1994 | Arai et al. . |
| 5,403,881 | 4/1995 | Okawa et al. ........................... 524/261 |

FOREIGN PATENT DOCUMENTS

| | | |
|---|---|---|
| 621150 | 6/1992 | Australia . |
| 0 236 042 | 9/1987 | European Pat. Off. . |
| 0 747 443 | 12/1996 | European Pat. Off. . |
| 0 752 450 | 1/1997 | European Pat. Off. . |
| 0 798 338 | 10/1997 | European Pat. Off. . |
| 0 802 222 | 10/1997 | European Pat. Off. . |
| 4210349 | 10/1993 | Germany . |

OTHER PUBLICATIONS

U.S. application Ser. No. 08/657,505 de Buyl, et al. filed Jun. 4, 1996.
U.S. application Ser. No. 08/781,340 Palmer filed Jan. 10, 1997.
U.S. application Ser. No. 08/916,165 Palmer filed Aug. 21, 1997.
U.S. application Ser. No. 08/937,525 de Buyl, et al. filed Sep. 25, 1997.
U.S. application Ser. No. 08/938,976 de Buyl, et al. filed Sep. 26, 1997.

*Primary Examiner*—Jan H. Silbaugh
*Assistant Examiner*—Kenneth M. Jones
*Attorney, Agent, or Firm*—Patricia M. Scaduto

[57] ABSTRACT

A method of forming a seal in a confined configuration with a moisture curable, alkoxy-functional RTV composition. The method comprises the steps of: (i) applying to a first substrate comprising a grooved substantially flat surface a moisture curable alkoxy-functional RTV composition; (ii) positioning the grooved substantially flat surface in occluding proximity with a substantially flat surface of a second substrate, so the alkoxy-functional RTV composition effects a seal therebetween; (iii) exposing the alkoxy-functional RTV composition to a detrimental temperature; and (iv) curing the alkoxy-functional RTV composition.

20 Claims, No Drawings

METHOD OF FORMING A SEAL IN A CONFINED CONFIGURATION WITH AN ALKOXY-FUNCTIONAL RTV COMPOSITION

BACKGROUND OF THE INVENTION

1. Field of the Invention

This invention is a method of forming a seal in a confined configuration with a moisture curable, alkoxy-functional room temperature vulcanizing (RTV) composition. The method comprises the steps of: (i) applying to a first substrate comprising a grooved substantially flat surface a moisture curable alkoxy-functional RTV composition; (ii) positioning the grooved substantially flat surface in occluding proximity with a substantially flat surface of a second substrate, so the alkoxy-functional RTV composition effects a seal therebetween; (iii) exposing the alkoxy-functional RTV composition to a detrimental temperature; and (iv) curing the alkoxy-functional RTV composition.

2. Background Information

One of the many uses for moisture curable RTV compositions, is as a formed-in-place gasket (FIPG), such as for sealing automotive engine components. The function of the FIPG is to provide a durable, oil resistant adhesive seal. The RTV composition is applied as a pumpable composition and cures after the parts are assembled. One example would be for sealing the engine oil pan to the engine block. The RTV composition is dispensed directly onto one substrate's flange area and then immediately assembled to the other mating substrate forming a seal between the substrates. In many cases, the RTV composition is in a confined configuration where moisture is very slow to permeate to the center of the flange. Under these conditions it may take several weeks for the RTV composition to cure fully at the center of the flange. Many flange designs call for a groove to be cast into the center of the flange into which the RTV composition is applied. This groove increases the thickness of the RTV composition applied, which further increases the cure time for the RTV composition. Therefore, the RTV composition in a confined configuration can be exposed to engine running conditions, before the RTV composition has fully cured. The automotive manufacturers realize this and have a specific performance test to ensure that the RTV composition will properly cure after being exposed to high temperature during the curing process. Specifically, the performance test requires applying a sealant to a fixture having a 0.004 inch gap to allow moisture permeation and heating the fixture at 130° C. for 100 hours. After heating is stopped, the fixture is taken apart and the sealant is exposed to the atmosphere. To pass the test, the sealant must cure within 24 hours to a rubber consistency.

Moisture curable, RTV compositions used for sealing in confined configurations include those which evolve acetic acid, ketoximes, or amines as by-products during cure. These by-products may corrode the sensitive metals or plastics to which the sealant is bonded. The use of moisture curable sealant compositions which do not have such corrosive by-products produced during cure would therefore be highly desirable.

One potential alternative would be an alkoxy-functional RTV composition, since alkoxy-functional RTV compositions liberate alcohols during cure. However, it appears that alkoxy-functional RTV compositions containing titanium compounds comprising on average less then 3 alkoxy radicals bonded to the titanium, for example a dialkoxyethylacetoacetate titanate chelate, may not cure when the alkoxy-functional RTV compositions are in thick sections, such as in grooves, in a confined configuration and are exposed to elevated temperatures prior to curing. These seals will likely fail after exposure to the elevated temperatures due to inadequate curing.

The present inventors have determined that an alkoxy-functional RTV composition may be used for sealing in a confined configuration which is exposed to elevated temperatures if the alkoxy-functional RTV composition comprises a titanate compound comprising on average at least 3 alkoxy radicals bonded to titanium. For purposes of this invention, a confined configuration is a configuration which inhibits the permeation of moisture and therefore the rate of cure of the alkoxy-functional RTV silicone composition is retarded. In a confined configuration only a very small portion of the alkoxy-functional RTV silicone composition is exposed to a moisture containing atmosphere, when compared to the total volume of alkoxy-functional RTV silicone composition which needs to cure. Some exposure to moisture is necessary for this invention since the alkoxy-functional RTV silicone compositions useful herein require moisture to cure.

The objective of this invention is to provide a method of forming a seal in a confined configuration with an alkoxy-functional RTV composition.

SUMMARY OF THE INVENTION

The present invention is a method of forming a seal in a confined configuration with a moisture curable, alkoxy-functional RTV composition. The method comprises the steps of: (i) applying to a first substrate comprising a grooved substantially flat surface a moisture curable alkoxy-functional RTV composition; (ii) positioning the grooved substantially flat surface in occluding proximity with a substantially flat surface of a second substrate, so the alkoxy-functional RTV composition effects a seal therebetween; (iii) exposing the alkoxy-functional RTV composition to a detrimental temperature; and (iv) curing the alkoxy-functional RTV composition.

DETAILED DESCRIPTION OF THE INVENTION

This invention is a method of forming a seal in a confined configuration comprising the steps of (i) applying to a first substrate comprising a grooved substantially flat surface, where the groove has a width about 10 to 50 percent the width of the substantially flat surface and a depth about 30 to 70 percent the width of the groove, a moisture curable alkoxy-functional RTV composition comprising:

(A) polymers comprising on average at least 1.2 alkoxysilyl chain terminations per molecule described by formula

$$-SiR^1{}_x(OR)_{3-x},\qquad\text{(VII)}$$

where each R is independently selected from the group consisting of methyl, ethyl, n-propyl, isopropyl, n-butyl, sec-butyl, and isobutyl, $R^1$ is selected from the group consisting of methyl and ethyl, and x is 0 or 1, (B) a titanate compound comprising on average at least 3 alkoxy radicals bonded to titanium described by formula

$$-OR^3,\qquad\text{(V)}$$

where each $R^3$ is an independently selected monovalent aliphatic hydrocarbon radical comprising from 1 to about 12 carbon atoms, (C) an alkoxysilane described by formula $$R^4{}_z\text{Si}(OR)_{4-z},\quad \text{(VI)}$$

where each $R^4$ is independently selected from monovalent hydrocarbon radicals comprising from 1 to about 12 carbon atoms; each R is as defined above, and z is 0, 1 or 2, and (D) a filler;

(ii) positioning the grooved substantially flat surface in occluding proximity with a substantially flat surface of a second substrate, so the alkoxy-functional RTV composition effects a seal therebetween;

(iii) exposing the alkoxy-functional RTV composition to a detrimental temperature; and (iv) curing the alkoxy-functional RTV composition.

The alkoxy-functional RTV composition useful in the present method comprises polymers (Component (A)) comprising on average at least 1.2 alkoxysilyl chain terminations per molecule described by the formula (VII). The polymers may be linear or branched and may be homopolymers, copolymers, or terpolymers. The polymers may be a single species or a mixture of different polymers so long as the polymers comprise on average at least 1.2 alkoxysilyl chain terminations per molecule.

The repeating units of the polymers of Component (A) may include organic units, such as oxyalkylene units, or preferably siloxy units such as described by $R^9{}_s\text{SiO}_{(4-s)/2}$, where each $R^9$ is independently selected from the group consisting of alkyl groups comprising 1 to about 6 carbon atoms, phenyl, and fluorinated alkyl groups, and s is 0, 1, or 2. Examples of the alkyl groups described by $R^9$ include methyl, ethyl, propyl, butyl and hexyl. An example of the fluorinated alkyl groups described by $R^9$ includes 3,3,3-trifluoropropyl. The preferred polymers of Component (A) comprise polydiorganosiloxanes having repeating units described by $-(R^9{}_s\text{SiO}_{(4-s)/2})_f-$, where each $R^9$ is methyl, s is 2, and f is a value such that Component (A) has a viscosity within a range of about 0.5 to 3000 Pa.s at 25° C. and preferably within a range of about 5 to 150 Pa.s at 25° C.

The polymers of Component (A) comprise on average at least 1.2 alkoxysilyl chain terminations per molecule described by the formula (VII). In preferred embodiments, each R is independently selected from the group consisting of methyl and ethyl, and x is 0. It is most preferred that each R is methyl.

In more preferred embodiments of Component (A), a spacer group Z is bonded to the silicon atom of the alkoxysilyl chain termination, where Z is selected from the group consisting of divalent hydrocarbon radicals free of aliphatic unsaturation comprising about 2 to 18 carbon atoms and a combination of divalent hydrocarbon radicals and siloxane segments described by formula

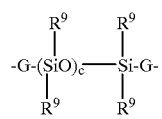

where $R^9$ is as defined above, each G is a divalent hydrocarbon radical free of aliphatic unsaturation comprising about 2 to 18 carbon atoms, and c is a whole number from 1 to about 6. Examples of the divalent hydrocarbon radicals describing Z and G include alkylene radicals such as ethylene, methylmethylene, propylene, butylene, pentylene, and hexylene; and arylene radicals including phenylene; with alkylene radicals being preferred, and in particular ethylene. More preferably, Z is a combination of divalent hydrocarbon radicals and siloxane segments, as described above, where G is an alkylene, preferably, ethylene; each $R^9$ is methyl; and c is 1.

The polymers of Component (A) are required to have on average at least 1.2 alkoxysilyl chain terminations per molecule, and preferably, the polymers of Component (A) comprise on average at least 1.5 alkoxysilyl chain terminations per molecule. Since the polymers of Component (A) are required to have on average at least 1.2 alkoxysilyl chain terminations per molecule, some polymers may contain other types of chain terminations. Preferably, this other type of chain termination comprises organosilyl chain terminations selected from the group consisting of $CH_2=CH-SiR^9{}_2-$ and $R^2{}_3-Si-$, where $R^9$ is as defined above and each $R^2$ is independently selected from the group consisting of methyl, ethyl and vinyl. Examples of organosilyl chain terminations include trimethylsilyl, triethylsilyl, vinyldimethylsilyl, and vinylmethylphenylsilyl, with vinyldimethylsilyl being preferred.

The polydiorganosiloxanes useful in the present method, as well as crosslinkers, fillers, and other optional ingredients useful in alkoxy-functional RTV sealant compositions are well known in the art and are illustrated by Ceyzeriat et al., U.S. Pat. No. 3,151,099; Brown et al., U.S. Pat. No. 3,161,614; Weyenberg, U.S. Pat. No. 3,175,993 and U.S. Pat. No. 3,334,067; Klosowski et al., U.S. Pat. No. 4,871,827; Kamis et al., U.S. Pat. No. 4,898,910; and Chu et al., U.S. Pat. No. 4,956,435; all of which are hereby incorporated by reference to show alkoxy-functional RTV sealant ingredients and methods of preparing alkoxy-functional RTV sealant compositions.

Polydiorganosiloxanes within the scope of Component (A), are exemplified by the disclosures of Brown et al., U.S. Pat. No. 3,161,614, and are described, for example, by formula (I)

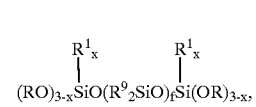

and by mixtures of the polydiorganosiloxanes described by formula (I) and polydiorganosiloxanes described, for example, by formula (II)

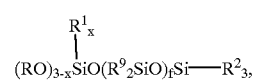

where R, $R^1$, $R^2$, $R^9$, x, and f are as defined above.

Preferred polydiorganosiloxanes within the scope of Component (A), include those described by Weyenberg, U.S. Pat. No. 3,175,993 and Klosowski et al., U.S. Pat. No. 4,871,827, which are hereby incorporated by reference, and can be described, for example, by formula (III)

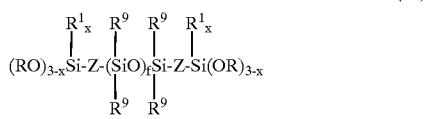

(III)

where R, $R^1$, $R^9$, Z, x, and f are as described above.

Other preferred Component (A) polymers useful in this invention are mixtures of the polydiorganosiloxanes described by formula (III) and polydiorganosiloxanes described by Kamis et al., U.S. Pat. No. 4,898,910, which is hereby incorporated by reference, and described, for example, by formula (IV)

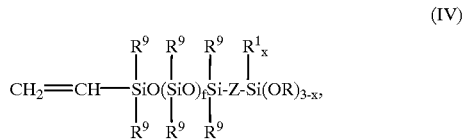

(IV)

where R, $R^1$, $R^9$, Z, x and f are as defined above.

When Component (A) comprises mixtures of polydiorganosiloxanes described by formulas (III) and (IV), typically the polydiorganosiloxane described by formula (IV) will be present in an amount such that 40 percent or less of the chain terminations of Component (A) will be organosilyl chain terminations, and preferably such that less than 25 percent of the chain terminations of Component (A) are organosilyl chain terminations.

The most preferred Component (A) polymers useful in this invention are those polymers described by formula (III).

Component (A) also includes organic polymers comprising on average at least 1.2 alkoxysilyl chain terminations per molecule described by formula (VII) i.e., —$SiR^1_x(OR)_{3-x}$, where R, $R^1$, and x are as defined above. The organic polymers within the scope of Component (A) may also comprise a spacer group —Z— bonded to the silicon atom of the alkoxysilyl chain termination, where Z is as defined above. One type of organic polymer useful in the invention is the polyoxyalkylene, described by Okawa et al., U.S. Pat. No. 5,403,881, and hereby incorporated by reference to show polyoxyalkylene polymers comprising on average at least 1.2 alkoxysilyl chain terminations per molecule described by formula (VII) and methods of preparing these polymers.

The amount of Component (A) useful in the alkoxy-functional RTV compositions of the present method is from about 30 to 85 weight percent based on the total weight of the alkoxy-functional RTV composition. Preferably, (A) is added in amounts from about 45 to 70 weight percent on the same basis.

The alkoxy-functional RTV compositions useful in the present method also comprise a titanate compound (B) comprising on average at least 3 alkoxy radicals bonded to titanium, where each alkoxy radical is described by formula (V), i.e. —$OR^3$, where each $R^3$ is an independently selected monovalent aliphatic hydrocarbon radical comprising from 1 to about 12 carbon atoms. Each $R^3$ can be linear or branched. Examples of useful aliphatic monovalent hydrocarbon radicals represented by $R^3$ include methyl, ethyl, n-propyl, isopropyl, n-butyl, sec-butyl, isobutyl, tertiary butyl, tertiary amyl, 2,4-dimethyl-3-pentyl, 2-ethylhexyl, octyl, and dodecyl. Preferably, each $R^3$ is an independently selected monovalent aliphatic hydrocarbon radical comprising from 1 to about 8 carbon atoms. More preferably, each $R^3$ is a tertiary alkyl radical, with tertiary amyl being most preferred.

The titanate compound useful in the present method comprises on average at least 3 alkoxy radicals bonded to titanium, where each alkoxy radical is described by formula (V). Preferably, the titanate compound comprises on average from about 3.4 to 4 alkoxy radicals described by formula (V). More preferably the titanate compound comprises on average from about 3.6 to 4 alkoxy radicals described by formula (V). Any valencies of the titanate compound not substituted with an alkoxy radical may be filled by other radicals which will form stable titanate compounds, for example, chelate ligands such as ethyl acetoacetate or acetylacetonate. In addition, so long as the titanate compound comprises on average at least 3 alkoxy groups, a mixture of titanate compounds may be used, for example a mixture comprising a tetraalkyl titanate and a titanium chelate such as diisopropoxy-bis(ethyl acetoacetate)titanate chelate.

The amount of titanate compound (B) useful in the present alkoxy-functional RTV compositions is from about 0.1 to 5 weight percent based on the total weight of the alkoxy-functional RTV silicone composition. Preferably, (B) is added in amounts from about 1 to 3.5 weight percent on the same basis. The titanate compound can be a single species or a mixture of different species.

The alkoxy-functional RTV compositions useful in the present method also comprise an alkoxysilane (C) described by formula (VI), i.e. $R^4_z Si(OR)_{4-z}$, where each $R^4$ is independently selected from monovalent hydrocarbon radicals comprising from 1 to about 12 carbon atoms; each R is independently selected from the group consisting of methyl, ethyl, n-propyl, isopropyl, n-butyl, sec-butyl, and isobutyl, and z is 0, 1 or 2. The monovalent hydrocarbon radicals comprising 1 to about 12 carbon atoms represented by $R^4$ may be substituted and unsubstituted and include alkyl radicals such as methyl, ethyl, isobutyl, hexyl, octyl, and dodecyl; alkenyl radicals such as vinyl, allyl, and butadienyl; cycloalkyl radicals such as cyclobutyl, cyclopentyl, and cyclohexyl; cycloalkenyl radicals such as cyclopentenyl, and cyclohexenyl; aryl radicals such as phenyl; aralkyl radicals such as benzyl; alkaryl radicals such as tolyl; and haloalkyl radicals such as 3,3,3-trifluoropropyl and chloromethyl. Preferably, each $R^4$ is independently selected from the group consisting of methyl, ethyl, isobutyl and vinyl. More preferably each $R^4$ is methyl.

R is as described above.

In formula (VI) subscript z can be 0, 1, or 2. Preferably z is 1 or 2 with 1 being most preferred.

Examples of useful alkoxysilanes include methyltrimethoxysilane, methyltriethoxysilane, vinyltrimethoxysilane, phenyltrimethoxysilane, dodecyltrimethoxysilane, vinyltriethoxysilane, ethyltrimethoxysilane, ethyltriethoxysilane, dimethyldimethoxysilane, vinylmethyldimethoxysilane, dimethyldiethoxysilane, ethylmethyldiethoxysilane, and tetraethoxysilane. The partial hydrolyzates of these alkoxysilanes can also be used in the present composition. Preferred alkoxysilanes include methyltrimethoxysilane and dimethyldimethoxysilane.

The amount of alkoxysilane useful in the alkoxy-functional RTV compositions of the present method is from about 0.1 to 10 weight percent based on the total weight of the alkoxy-functional RTV silicone composition, with about 0.5 to 3.5 weight percent on the same basis being preferred. The alkoxysilane may be a single species or a mixture of two or more species.

The alkoxy-functional RTV compositions useful in the present method also comprise a filler (D). The filler can be selected from those known to be useful in alkoxy-functional RTV sealants. Examples of useful fillers include ground, precipitated, and colloidal calcium carbonates which are untreated or treated with stearate or stearic acid; reinforcing silicas such as fumed silicas, precipitated silicas, and hydrophobed silicas; which are untreated or treated with silicone oil, halosilanes or silazanes; or crushed quartz, ground quartz, alumina, aluminum hydroxide, titanium dioxide, diatomaceous earth, iron oxide, carbon black, and graphite. Silica and calcium carbonate are especially useful and blends of fumed silica filler and treated precipitated calcium carbonate are preferred.

The amount of filler useful in the alkoxy-functional RTV compositions of the present method is from about 10 to 60 weight percent based on the total weight of the alkoxy-functional RTV silicone composition. Preferably, the filler is added in amounts from about 20 to 40 weight percent on the same basis. The filler may be added as a single species or as a mixture of two or more species.

Other ingredients which are conventionally used in alkoxy-functional RTV compositions such as adhesion promoters, rheology additives, fungicides, colorants, pigments, and plasticizers can be added as long as they do not interfere with the curability of the alkoxy-functional RTV compositions or reduce other desired properties.

The present invention is a method for forming a seal between two substrates in a confined configuration. The substrates useful for this method are preferably non-porous substrates and include metals such as aluminum, steel, and iron; metal alloys and plastic materials which are resistant to elevated temperatures. The first substrate comprises a grooved substantially flat surface and the second substrate comprises a substantially flat surface. As used herein, a "substantially flat surface" is a surface which is of a substantially planar configuration and capable of interfacing in close proximity to a second substantially flat surface. Also as used herein a "grooved substantially flat surface" is a substantially flat surface which contains a groove.

The groove has a width about 10 to 60 percent the width of the grooved substantially flat surface of the first substrate and a depth about 30 to 70 percent the width of the groove. Preferably, the groove has a width about 20 to 40 percent the width of the grooved substantially flat surface of the first substrate and a depth about 40 to 60 percent the width of the groove. More preferably, the groove has a width of about 0.5 mm to 24 mm and a depth of about 0.15 mm to 17 mm. Most preferably, the groove has a width of about 1 mm to 16 mm and a depth of about 0.4 mm to 10 mm.

In the present method, a moisture curable alkoxy-functional RTV composition is applied to the grooved substantially flat surface of the first substrate and then the grooved substantially flat surface is brought into occluding proximity with the substantially flat surface of the second substrate, so the alkoxy-functional RTV composition effects a seal therebetween. The alkoxy-functional RTV composition may be applied by conventional methods such as by extrusion, coating, and injection. The alkoxy-functional RTV composition is applied to the groove and so the amount of alkoxy-functional RTV composition needed will depend on the width and depth of the groove, but a sufficient amount is needed to effect a seal when the surfaces of the two substrates are brought into occluding proximity. As used herein the term "occluding proximity" means a proximity such that the alkoxy-functional RTV composition is in a confined configuration so that moisture permeation to the alkoxy-functional RTV composition is inhibited and curing of the alkoxy-functional RTV composition in the groove is retarded. Preferably, the surfaces of the two substrates are brought into a proximity of about 0.01 to 0.25 mm. More preferably, the surfaces of the two substrates are brought into a proximity of about 0.075 to 0.125 mm.

The alkoxy-functional RTV composition of the present method is then exposed to a detrimental temperature as it is curing. As used herein, a "detrimental temperature" is a temperature which detrimentally affects the curing process of alkoxy-functional RTV compositions outside the scope of this method when they are exposed to such a temperature for a certain period of time. The exposure time required to detrimentally affect the curing process of alkoxy-functional RTV compositions outside the scope of this method decreases as the temperature increases. For example, at temperatures of about 100° C., the curing process of alkoxy-functional RTV compositions outside the scope of this method is affected when the exposure time is longer than about 72 hours. Preferably, the detrimental temperature is higher than about 110° C. at which temperatures an exposure time of greater than about 6 hours will detrimentally affect the curing process of alkoxy-functional RTV compositions outside the scope of this method. More preferably the detrimental temperature is from about 120° C. and 130° C., and the exposure time is from about 12 to 100 hours.

The alkoxy-functional RTV composition of the present method is then cured after exposure to the detrimental temperature. Since the alkoxy-functional RTV composition is cured by exposure to moisture, the amount of time it takes for the alkoxy-functional RTV composition to cure will depend on how much and how quickly moisture can permeate into the alkoxy-functional RTV composition.

This invention is further illustrated by the following examples which are presented for that purpose and are not intended to limit the scope of the claims herein. In the examples, "part" or "parts" refer to part by weight or parts by weight (expressed as "pbw") and viscosities were measured at 25° C. Me represents methyl, Ot-Am represents tertiary-amyloxy, Ot-Bu represents tertiary-butoxy, On-Bu represents n-butoxy, and OiPr represents isopropoxy.

Ingredients Used in the Examples

POLYMER 1=polydimethylsiloxanes described by formula

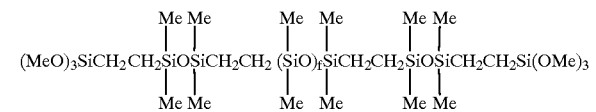

where f had an average value such that Polymer 1's overall viscosity was 60 Pa.s.

TITANIUM 1=a mixture of titanium molecules having an average formula

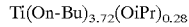

TITANIUM 2=a mixture of titanium molecules having an average formula

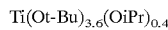

TITANIUM 3=diisopropoxy bis(ethylacetoacetate)titanate chelate

TITANIUM 4=Triisopropylethylacetoacetate titanate chelate

TITANIUM 5=a mixture of titanium molecules having an average formula

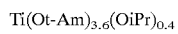

ALKOXYSILANE 1=methyltrimethoxysilane
ALKOXYSILANE 2=dimethyldimethoxysilane
ALKOXYSILANE 3=methyltriethoxysilane
ALKOXYSILANE 4=Octyltrimethoxysilane
ALKOXYSILANE 5=Phenyltrimethoxysilane
ADHESION PROMOTER 1=(Ethylenediaminepropyl)trimethoxysilane
ADHESION PROMOTER 2=3-Mercaptopropyltrimethoxysilane
SILICA FILLER=fumed silica filler having a surface area of 150 $m^2/g$ and an adsorbed water content of 0.6 weight percent.
ppt $CaCO_3$=a precipitated calcium carbonate having a surface area of about 22 $m^2/g$, surface treated with stearic acid and having an adsorbed water content of 0.4 weight percent.
grd CaCO3=a ground calcium carbonate having a particle size of about 2.0 microns, surface treated with stearic acid and having adsorbed water content of 0.07 weight percent.

Preparation of Triisopropylethylacetoacetate Titanate Chelate 52.5 g (0.404 moles) of ethylacetoacetate was slowly added to 114.7 g (0.404 moles) of tetraisopropytitanate and a triisopropylethylacetoacetate titanate chelate was formed and 23.5 g (0.392 moles) of isopropyl alcohol, as analyzed by gas chromatography, was removed by vacuum. The triisopropylethylacetoacetate titanate chelate formed was an orange translucent color.

Cure Rate Measured by Skin Over Time (SOT)

Alkoxy-functional RTV sealant compositions were prepared, under conditions to exclude moisture, using the ingredients and procedures described in the following examples. After 24 hours storage at 25° C. and 50% relative humidity, a quantity of sealant was pressed out onto a flat surface. This quantity of sealant was then spread out flat using a spatula. A stopwatch was started and the composition SOT was measured by lightly touching the surface of the composition with the end of a finger. This was done every minute until when the fingertip is pressed into the composition, no sealant was present on fingertip. This is the SOT recorded in minutes.

Test Method to Measure a Composition's Curability After Exposure to Elevated Temperatures ("Curability at Temparature")

A test is used by automotive manufacturers for evaluating a composition's uncured heat resistance so to determine if a sealant in a confined configuration will cure if exposed to elevated temperatures. The test sealant is applied into an aluminum test plate which has a groove (5 mm width, 2 mm depth, 100 mm in length) avoiding any inclusion of air bubbles. A flat aluminum plate is then immediately pressed to the plate with sealant, leaving a 0.1 mm gap between the plates using a metal spacer. The two plates are fastened together and any excess sealant is scraped off after squeezing out. The test fixture is placed in a forced draft oven at 130° C. for 100 hours. After the heating cycle the test fixture is removed and immediately disassembled. The state of cure of the sealant is noted after exposure to moisture for 4 hours at 23° C. and 50% relative humidity and after 24 hours at 23° C. and 50% relative humidity. The test is considered passed if the sealant has cured to a rubber consistency within 24 hours. Pass=cured to a rubber consistency; Pass*=cured to a rubber consistency but soft and tacky; and Fail=not cured to a rubber consistency.

EXAMPLE 1

Five alkoxy functional RTV sealants were prepared, under conditions to exclude moisture, using the ingredients described in Table 1. The compositions were prepared by mixing the alkoxysilane and titanium compound with polymer, then mixing in the fillers and drawing a vacuum to remove incorporated air. The moles of titanium present in each formulation was held constant at about 0.0046 moles. The alkoxy functional RTV sealant compositions were stored in containers sealed to prevent atmospheric moisture from entering. SOT and curability at temperature testing were done as described above and the results provided in Table 1. The results demonstrate that alkoxy-functional compositions containing titanium compounds having on average at least 3 alkoxy groups bonded to titanium will cure after exposure to elevated temperatures as demonstrated by the curability at temperature test.

TABLE 1

Use of Different Titanium Compounds

| INGREDIENT | 2A | 2B | 2C[a] | 2D | 2E |
|---|---|---|---|---|---|
| POLYMER 1, pbw | 65.22 | 65.22 | 64.75 | 65.02 | 64.89 |
| ALKOXYSILANE 1, pbw | 2.25 | 2.25 | 2.25 | 2.25 | 2.25 |
| TITANIUM 1, pbw | 1.53 | 0 | 0 | 0 | 0 |
| TITANIUM 2, pbw | 0 | 1.53 | 0 | 0 | 0 |
| TITANIUM 3, pbw | 0 | 0 | 2.0 | 0 | 0 |
| TITANIUM 4, pbw | 0 | 0 | 0 | 1.73 | 0 |
| TITANIUM 5, pbw | 0 | 0 | 0 | 0 | 1.86 |
| SILICA FILLER, pbw | 1 | 1 | 1 | 1 | 1 |
| ppt CaCO3; pbw | 30 | 30 | 30 | 30 | 30 |
| AVERAGE MOLES ALKOXY ON TITANIUM/MOLE TITANIUM | 4 | 4 | 2 | 3 | 4 |
| SKIN OVER TIME, MINUTES | 45 | 10.5 | 11.5 | 10 | 9 |
| CURABILITY AT TEMPERATURE | | | | | |
| AFTER 4 HRS | PASS* | PASS* | FAIL | PASS* | PASS |
| AFTER 24 HRS | PASS | PASS* | FAIL | PASS* | PASS |

[a]Comparative Example

EXAMPLE 2

Three alkoxy functional RTV sealants were prepared, under conditions to exclude moisture, using the ingredients described in Table 2. The compositions were prepared by mixing the alkoxysilane, titanium compound and adhesion promoters with polymer, then mixing in the fillers and drawing a vacuum to remove incorporated air. SOT and curability at temperature testing were done as described above and the results are also provided in Table 2. Table 2 shows the addition of blends of Titanium 2 and Titanium 3. Table 2 demonstrates that alkoxy-functional compositions containing titanium compounds having on average at least 3 alkoxy groups bonded to titanium will cure after exposure to elevated temperatures as demonstrated by the curability at temperature test.

TABLE 2

Use of Blends of Titanium Compounds

| INGREDIENT | Sample | | |
|---|---|---|---|
| | 2A | 2B[a] | 2C[a] |
| POLYMER 1, pbw | 58.73 | 58.23 | 57.73 |
| TITANIUM 2, pbw | 0.5 | 0.5 | 0.5 |
| TITANIUM 3, pbw | 0.5 | 1.0 | 1.5 |
| ALKOXYSILANE 1, pbw | 2.0 | 2.0 | 2.0 |
| ADHESION PROMOTOR 1, pbw | 0.15 | 0.15 | 0.15 |
| ADHESION PROMOTOR 2, pbw | 0.12 | 0.12 | 0.12 |
| SILICA FILLER, pbw | 2.0 | 2.0 | 2.0 |
| ppt CaCO3, pbw | 32 | 32 | 32 |
| grd CaCO3, pbw | 4 | 4 | 4 |
| AVERAGE MOLES ALKOXY ON TITANIUM/MOLE TITANIUM | 3.11 | 2.76 | 2.57 |
| SKIN OVER TIME, MINUTES | 6 | 8 | 9 |
| CURABILITY AT TEMP., | | | |
| 4 HRS | PASS* | FAIL | FAIL |
| 24 HRS | PASS | FAIL | FAIL |

[a]Comparative Example

EXAMPLE 3

(a) Four alkoxy-functional RTV sealant compositions (3A–3D) were prepared in the manner described in Example 1, using the ingredients described in Table 3(a). SOT and curability at temperature testing were done as described above and the results are also provided in Table 3(a). The moles of alkoxysilane present in each formulation were held constant at about 0.0165 moles. Table 3(a) demonstrates that so long as a titanium compound having on average at least 3 alkoxy groups bonded to titanium is present in the composition, the alkoxysilane may be varied and the composition will still cure as demonstrated by the curability at temperature test after exposure to elevated temperatures.

TABLE 3(a)

Use of Different Trialkoxysilanes with Titanium 5 Compound

| INGREDIENT | Sample | | | |
|---|---|---|---|---|
| | 3A | 3B | 3C | 3D |
| POLYMER 1, pbw | 64.75 | 63.51 | 63.14 | 63.72 |
| TITANIUM 5, pbw | 2 | 2 | 2 | 2 |
| ALKOXYSILANE 1, pbw | 2.25 | 0 | 0 | 0 |
| ALKOXYSILANE 3, pbw | 0 | 2.94 | 0 | 0 |
| ALKOXYSILANE 4, pbw | 0 | 0 | 3.87 | 0 |
| ALKOXYSILANE 5, pbw | 0 | 0 | 0 | 3.28 |
| SILICA FILLER, pbw | 1.0 | 1.0 | 1.0 | 1.0 |
| ppt CaCO3, pbw | 30 | 30 | 30 | 30 |
| AVERAGE MOLES ALKOXY ON TITANIUM/MOLE TITANIUM | 4 | 4 | 4 | 4 |
| SKIN OVER TIME, (MIN.) | 12 | 22 | 18 | 22 |
| CURABILITY AT TEMP, | | | | |
| 4 HRS | PASS | PASS | FAIL | PASS* |
| 24 HRS | PASS | PASS | PASS* | PASS |

(b) Four alkoxy-functional RTV sealant compositions (3E–3H) were prepared in the manner described in Example 1, using the ingredients described in Table 3(b). SOT and curability at temperature testing were done as described above and the results are also provided in Table 3(b). The moles of alkoxysilane present in each formulation were held constant at about 0.0165 moles. Table 3(b) demonstrates that a titanium compound having on average less than 3 alkoxy groups bonded to the titanium will not cure after exposure to elevated temperatures as demonstrated by the curability at temperature test, even with different alkoxysilanes.

TABLE 3(b)

Use of Different Trialkoxysilanes with Titanium 3 Compound

| INGREDIENT | Sample | | | |
|---|---|---|---|---|
| | 3E[a] | 3F[a] | 3G[a] | 3H[a] |
| POLYMER 1, pbw | 64.75 | 63.51 | 63.14 | 63.72 |
| TITANIUM 3, pbw | 2 | 2 | 2 | 2 |
| ALKOXYSILANE 1, pbw | 2.25 | 0 | 0 | 0 |
| ALKOXYSILANE 3, pbw | 0 | 2.94 | 0 | 0 |
| ALKOXYSILANE 4, pbw | 0 | 0 | 3.87 | 0 |
| ALKOXYSILANE 5, pbw | 0 | 0 | 0 | 3.28 |
| SILICA FILLER, pbw | 1.0 | 1.0 | 1.0 | 1.0 |
| ppt CaCO3, pbw | 30 | 30 | 30 | 30 |
| AVERAGE MOLES ALKOXY ON TITANIUM/MOLE TITANIUM | 2 | 2 | 2 | 2 |
| SKIN OVER TIME, (MIN.) | 8 | 23 | 26 | 42 |
| CURABILITY AT TEMP, | | | | |
| 4 HRS | FAIL | FAIL | FAIL | FAIL |
| 24 HRS | FAIL | FAIL | FAIL | FAIL |

[a]Comparative Examples

EXAMPLE 4

An alkoxy-functional RTV sealant composition was prepared in the manner described in Example 1, using the ingredients described in Table 4. SOT and curability at temperature testing were done as described above and the results are also provided in Table 4. The moles of alkoxysilane present in the formulation was about 0.0165 moles. This example shows that a dialkoxysilane may also be used in the present invention.

TABLE 4

Use of Dialkoxysilane with Titanium 5 Compound

| INGREDIENT | Sample 4A |
|---|---|
| POLYMER 1, pbw | 65.01 |
| TITANIUM 5, pbw | 2.0 |
| ALKOXYSILANE 2, pbw | 1.99 |
| SILICA FILLER, pbw | 1.0 |
| ppt CaCO3, pbw | 30 |
| AVERAGE MOLES ALKOXY ON TITANIUM/MOLE TITANIUM | 4 |
| SKIN OVER TIME, (MIN.) | 1.5 |
| CURABILITY AT TEMP, | |
| 4 HRS | PASS |
| 24 HRS | PASS |

We claim:

1. A method of forming a seal in a confined configuration comprising the steps of (i) applying to a first substrate comprising a grooved substantially flat surface, where the groove has a width about 10 to 50 percent the width of the substantially flat surface and a depth about 30 to 70 percent the width of the groove, a moisture curable alkoxy-functional RTV composition comprising:

(A) polymers comprising on average at least 1.2 alkoxysilyl chain terminations per molecule described by formula —SiR$^1_x$(OR)$_{3-x}$, where each R is independently selected from the group consisting of methyl, ethyl, n-propyl, isopropyl, n-butyl, sec-butyl, and isobutyl, R$^1$ is selected from the group consisting of methyl and ethyl, and x is 0 or 1, (B) a titanate compound comprising on average at least 3 alkoxy radicals bonded to titanium described by formula

—OR$^3$, where each R$^3$ is an independently selected monovalent aliphatic hydrocarbon radical comprising from 1 to about 12 carbon atoms, (C) an alkoxysilane described by formula R$^4_z$Si(OR)$_{4-z}$, where each R$^4$ is independently selected from monovalent hydrocarbon radicals comprising from 1 to about 12 carbon atoms; each R is as defined above, and z is 0, 1 or 2, and (D) a filler;

(ii) positioning the grooved substantially flat surface in occluding proximity with a substantially flat surface of a second substrate, so the alkoxy-functional RTV composition effects a seal therebetween;

(iii) exposing the alkoxy-functional RTV composition to a detrimental temperature; and (iv) curing the alkoxy-functional RTV composition.

2. The method according to claim 1, where Component (A) of the alkoxy-functional RTV composition comprises a polydiorganosiloxane described by formula (I)

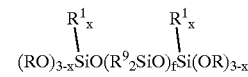

(I)

or a mixture of the polydiorganosiloxane described by formula (I) and a polydiorganosiloxane described by formula (II)

(II)

where each R$^2$ is independently selected from the group consisting of methyl, ethyl, and vinyl; each R$^9$ is independently selected from the group consisting of alkyl groups comprising 1 to about 6 carbon atoms, phenyl, and fluorinated alkyl groups; and f is a value such that Component (A) has a viscosity within a range of about 0.5 to 3000 Pa.s at 250° C.

3. The method according to claim 1, where Component (A) of the alkoxy-functional RTV composition comprises a polydiorganosiloxane described by formula (I)

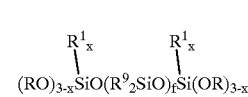

(I)

or a mixture of the polydiorganosiloxane described by formula (I) and a polydiorganosiloxane described by formula (II)

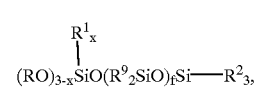

(II)

where each R is independently selected from the group consisting of methyl and ethyl; each R$^2$ is independently selected from the group consisting of methyl, ethyl, and vinyl; each R$^9$ is independently selected from the group consisting of alkyl groups comprising 1 to about 6 carbon atoms, phenyl, and fluorinated alkyl groups; x is 0; and f is a value such that Component (A) has a viscosity within a range of about 5 to 150 Pa.s at 25° C.; Component (B) comprises on average from about 3.4 to 4 alkoxy radicals bonded to titanium and each R$^3$ is a tertiary alkyl radical; and in Component (C) z is 1 or 2.

4. The method according to claim 1, where Component (A) of the alkoxy-functional RTV composition comprises a polydiorganosiloxane described by formula (III)

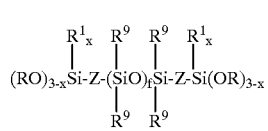

(III)

where each R$^9$ is independently selected from the group consisting of alkyl groups comprising 1 to about 6 carbon atoms, phenyl, and fluorinated alkyl groups; f is a value such that Component (A) has a viscosity within a range of about 0.5 to 3000 Pa.s at 25° C.; and each Z is independently selected from the group consisting of divalent hydrocarbon radicals free of aliphatic unsaturation comprising about 2 to 18 carbon atoms and a combination of divalent hydrocarbon radicals and siloxane segments described by formula

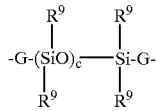

where $R^9$ is as defined above, each G is a divalent hydrocarbon radical free of aliphatic unsaturation comprising about 2 to 18 carbon atoms, and c is a whole number from 1 to about 6.

5. The method according to claim 4, where in Component (A) of the alkoxy-functional RTV composition each R is independently selected from the group consisting of methyl and ethyl; each $R^9$ is independently selected from the group consisting of methyl and ethyl; x is 0; and Z is selected from the group consisting of alkylenes and

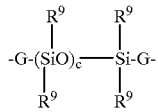

where G is an alkylene; Component (B) comprises on average from about 3.4 to 4 alkoxy radicals bonded to titanium and each $R^3$ is a tertiary alkyl radical; and in Component (C) z is 1 or 2.

6. The method according to claim 5, where in Component (A) of the alkoxy-functional RTV composition each R and $R^9$ is methyl; f is a value such that Component (A) has a viscosity within a range of about 5 to 150 Pa.s at 25° C.; and Z is

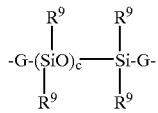

where G is ethylene; and c is 1; Component (B) comprises on average from about 3.6 to 4 alkoxy radicals bonded to titanium and each $R^3$ is a tertiary amyl radical; and in Component (C) z is 1.

7. The method according to claim 1, where Component (A) of the alkoxy-functional RTV composition comprises a mixture of a polydiorganosiloxane described by formula (III)

(III)

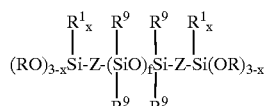

and a polydiorganosiloxane described by formula (IV)

(IV)

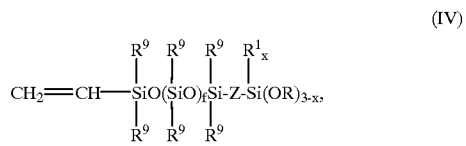

where each $R^9$ is independently selected from the group consisting of alkyl groups comprising 1 to about 6 carbon atoms, phenyl, and fluorinated alkyl groups; f is a value such that Component (A) has a viscosity within a range of about 0.5 to 3000 Pa.s at 25° C.; and each Z is independently selected from the group consisting of divalent hydrocarbon radicals free of aliphatic unsaturation comprising about 2 to 18 carbon atoms and a combination of divalent hydrocarbon radicals and siloxane segments described by formula

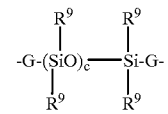

where $R^9$ is as defined above, each G is a divalent hydrocarbon radical free of aliphatic unsaturation comprising about 2 to 18 carbon atoms, and c is a whole number from 1 to about 6.

8. The method according to claim 7, where in Component (A) of the alkoxy-functional RTV composition each R is independently selected from the group consisting of methyl and ethyl; each $R^9$ is independently selected from the group consisting of methyl and ethyl; x is 0; Z is selected from the group consisting of alkylenes and

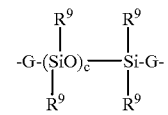

where G is an alkylene; and 40 percent or less of the chain terminations are organosilyl chain terminations selected from the group consisting of $CH_2=CH-SiR^9_2-$ and $R^2_3-Si-$, where $R^9$ is as defined above and each $R^2$ is independently selected from the group consisting of methyl, ethyl and vinyl; Component (B) comprises on average from about 3.4 to 4 alkoxy radicals bonded to titanium and each $R^3$ is a tertiary alkyl radical; and in Component (C) z is 1 or 2.

9. The method according to claim 8, where in Component (A) of the alkoxy-functional RTV composition each R and $R^9$ is methyl; f is a value such that Component (A) has a viscosity within a range of about 5 to 150 Pa.s at 25° C.; and Z is

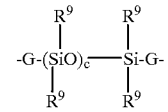

where G is ethylene; c is 1; and 25 percent or less of the chain terminations are organosilyl chain terminations described by $CH_2=CH-SiR^9_2-$, where $R^9$ is as defined above; Component (B) comprises on average from about 3.6 to 4 alkoxy radicals bonded to titanium and each $R^3$ is a tertiary amyl radical; and in Component (C) z is 1.

10. The method according to claim 1, where the groove has a width about 20 to 40 percent the width of the grooved substantially flat surface of the first substrate and a depth about 30 to 70 percent the width of the groove.

11. The method according to claim 4, where the groove has a width about 20 to 40 percent the width of the grooved substantially flat surface of the first substrate and a depth about 30 to 70 percent the width of the groove.

12. The method according to claim 7, where the groove has a width about 20 to 40 percent the width of the grooved substantially flat surface of the first substrate and a depth about 30 to 70 percent the width of the groove, and in step(ii) the surfaces of the substrates are brought into a proximity of about 0.01 to 0.25 mm.

13. The method according to claim 1, where the groove has a width of about 0.5 to 24 mm and a depth of about 0.15 to 17 mm, and the detrimental temperature is higher than about 110° C. for an exposure time of greater than about 6 hours.

14. The method according to claim 3, where the groove has a width of about 0.5 to 24 mm and a depth of about 0.15 to 17 mm, and the detrimental temperature is higher than about 110° C. for an exposure time of greater than about 6 hours.

15. The method according to claim 5, where the groove has a width of about 0.5 to 24 mm and a depth of about 0.15 to 17 mm, the detrimental temperature is higher than about 110° C. for an exposure time of greater than about 6 hours, and in step(ii) the surfaces of the substrates are brought into a proximity of about 0.01 to 0.25 mm.

16. The method according to claim 8, where the groove has a width of about 0.5 to 24 mm and a depth of about 0.15 to 17 mm, the detrimental temperature is higher than about 110° C. for an exposure time of greater than about 6 hours, and in step(ii) the surfaces of the substrates are brought into a proximity of about 0.01 to 0.25 mm.

17. The method according to claim 1, where the groove has a width of about 1 to 16 mm and a depth of about 0.4 to 10 mm, and the detrimental temperature is from about 120° C. to 130° C. for an exposure time of about 12 to 100 hours.

18. The method according to claim 6, where the groove has a width of about 1 to 16 mm and a depth of about 0.4 to 10 mm, the detrimental temperature is from about 120° C. to 130° C. for an exposure time of about 12 to 100 hours, and in step(ii) the surfaces of the substrates are brought into a proximity of about 0.075 to 0.125 mm.

19. The method according to claim 9, where the groove has a width of about 1 to 16 mm and a depth of about 0.4 to 10 mm, the detrimental temperature is from about 120° C. to 130° C. for an exposure time of about 12 to 100 hours and in step(ii) the surfaces of the substrates are brought into a proximity of about 0.075 to 0.125 mm.

20. The method according to claim 13, where Component (A) comprises a polyoxyalkylene or a polydiorganosiloxane.

* * * * *